(12) United States Patent
Tu

(10) Patent No.: US 10,509,175 B2
(45) Date of Patent: Dec. 17, 2019

(54) OPTICAL SWITCH AND OPTICAL SWITCHING SYSTEM

(71) Applicant: HUAWEI TECHNOLOGIES CO., LTD., Shenzhen, Guangdong (CN)

(72) Inventor: Xin Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/238,220

(22) Filed: Jan. 2, 2019

(65) Prior Publication Data

US 2019/0137692 A1 May 9, 2019

Related U.S. Application Data

(63) Continuation of application No. PCT/CN2017/075322, filed on Mar. 1, 2017.

(30) Foreign Application Priority Data

Aug. 1, 2016 (CN) .......................... 2016 1 0620025

(51) Int. Cl.
*G02B 6/35* (2006.01)
*G02B 6/28* (2006.01)
(Continued)

(52) U.S. Cl.
CPC .......... *G02B 6/3502* (2013.01); *G02B 6/122* (2013.01); *G02B 6/28* (2013.01); *G02B 6/354* (2013.01); *G02B 2006/12145* (2013.01)

(58) Field of Classification Search
CPC ........ G02B 6/3502; G02B 6/122; G02B 6/28; G02B 6/354
See application file for complete search history.

(56) References Cited

U.S. PATENT DOCUMENTS 6,453,086 B1 9/2002 Tarazona
6,826,325 B2 * 11/2004 Tabata ................. G02B 6/3502
385/17
(Continued)

FOREIGN PATENT DOCUMENTS

CN 1342272 A 3/2002
CN 1536422 A 10/2004
(Continued)

OTHER PUBLICATIONS

Benjamin G. Lee et al, Monolithic Silicon Integration of Scaled Photonic Switch Fabrics, CMOS Logic, and Device Driver Circuits. Journal of Lightwave Technology, vol. 32, No. 4, Feb. 15, 2014, 9 pages.
(Continued)

*Primary Examiner* — Sung H Pak
(74) *Attorney, Agent, or Firm* — Fish & Richardson P.C.

(57) ABSTRACT

This application discloses an optical switch and an optical switching system. Both a first waveguide and a second waveguide of the optical switch are immovable relative to a substrate and are located in a first plane. A first deformable waveguide is also located in the first plane. A first section of the first deformable waveguide is fixed relative to the substrate, and a second section other than the first section can deform under control of a first actuator. When the first deformable waveguide is in a first state, the first deformable waveguide is optically decoupled from the first waveguide and the second waveguide, and the optical switch is in a through state. When the first deformable waveguide is in a second state, the first deformable waveguide is optically coupled to the first waveguide and the second waveguide, and the optical switch is in a drop state.

15 Claims, 12 Drawing Sheets

(51) Int. Cl.
  *G02B 6/122* (2006.01)
  *G02B 6/12* (2006.01)

(56) References Cited

U.S. PATENT DOCUMENTS

| | | | | |
|---|---|---|---|---|
| 7,099,527 | B2* | 8/2006 | Ogawa | G02B 6/3502 385/16 |
| 7,190,862 | B1* | 3/2007 | Peterson | G02B 6/3502 385/16 |
| 7,272,275 | B2* | 9/2007 | Spoonhower | G02B 6/12004 345/55 |
| 7,903,916 | B2* | 3/2011 | Hioki | B29D 11/00663 385/123 |
| 9,588,293 | B2* | 3/2017 | Ellis-Monaghan | G02B 6/1225 |
| 10,061,085 | B2* | 8/2018 | Wu | G02B 6/29344 |
| 2002/0181855 | A1 | 12/2002 | Xue et al. | |
| 2003/0108274 | A1 | 6/2003 | Haronian | |
| 2003/0223675 | A1 | 12/2003 | Berger et al. | |
| 2004/0013344 | A1 | 1/2004 | Blau | |
| 2004/0196522 | A1 | 10/2004 | Lee et al. | |
| 2006/0002652 | A1 | 1/2006 | Yang et al. | |
| 2010/0024755 | A1 | 2/2010 | Herden et al. | |
| 2015/0010811 | A1 | 1/2015 | Egorov et al. | |

FOREIGN PATENT DOCUMENTS

| | | |
|---|---|---|
| CN | 1715977 A | 1/2006 |
| JP | 2004347867 A | 12/2004 |
| JP | 2006194956 A | 7/2006 |
| KR | 20050020053 A | 3/2005 |

OTHER PUBLICATIONS

Long Chen et al, Compact, low-loss and low-power 8×8 broadband silicon optical switch. Aug. 13, 2012 / vol. 20, No. 17 / Optics Express, 9 pages.
J. Kim et al, 1100*100 Port MEMS-Based Optical Crossconnect With 4-dB Maximum Loss, IEEE Photonics Technology Letters, vol. 15, No. 11, Nov. 2003, 4 pages.
International Search Report issued in International Application No. PCT/CN2017/075322 dated Jun. 8, 2017, 16 pages.
Chinese Office Action issued in Chinese Application No. 201610620025 dated Mar. 26, 2019, 14 pages.
Chinese Search Report issued in Chinese Application No. 201610620025 dated Mar. 11, 2019, 2 pages.
Extended European Search Report issued in European Application No. 17836155.6 dated Jul. 4, 2019, 8 pages.

* cited by examiner

OPTICAL SWITCH AND OPTICAL SWITCHING SYSTEM

CROSS-REFERENCE TO RELATED APPLICATIONS

This application is a continuation of International Application No. PCT/CN2017/075322, filed on Mar. 1, 2017, which claims priority to Chinese Patent Application No. 201610620025.0, filed on Aug. 1, 2016. The disclosures of the aforementioned applications are hereby incorporated by reference in their entireties.

TECHNICAL FIELD

This application relates to the optical communications field, and more specifically, to an optical switch and an optical switching system.

BACKGROUND

Development of a dense wavelength division multiplexing (DWDM) technology has resulted in a continuous increase in an information transmission speed and capacity in an optical fiber communications link, and resulted in an increase in requirements for an information exchange speed and capacity in an optical communications network (for example, a metropolitan area network or a data center). An all-optical switching system becomes a development trend in the optical communications network. An optical switch is a key device for implementing the all-optical switching system. The optical switch may implement functions such as route selection, wavelength selection, optical cross-connection, and self-healing protection of an all-optical layer. Currently, an optical switch mainly includes a conventional mechanical optical switch, a micro-electro-mechanical system (MMEMS) optical switch, a liquid crystal optical switch, a waveguide optical switch, a semiconductor optical amplifier optical switch, and the like.

A conventional MEMS optical switch is usually based on an electrostatic-actuation micro reflector structure, has advantages such as a low insertion loss, low crosstalk, a high extinction ratio, good scalability, and simple control, and may have at least 1000 ports in scale. However, because a rotation speed of a micro reflector is low, a switching speed of this type of optical switch usually can reach only a millisecond level. Consequently, a requirement for a future microsecond-level switch speed cannot be met. Because a process of a silicon-based waveguide optical switch is compatible with a mature complementary metal oxide semiconductor (CMOS) process, the silicon-based waveguide optical switch has advantages such as low costs and high integration, and it is easy to implement a large-scale optical switch matrix. A switching speed of the optical switch may reach a microsecond level by using a thermo-optic effect of silicon materials. However, the thermo-optic effect of silicon materials is relatively weak, and a refractive index changes slightly. Therefore, a Mach-Zehnder interferometer (MZI) structure needs to be used to implement a 1×2 or 2×2 optical switch. The large-scale optical switch matrix is formed by cascading optical switches. The optical switch of the MZI structure has a noticeable loss in both a drop state and a through state, and the loss increases rapidly with an increase in dimensions of the optical switch matrix. The silicon-based waveguide optical switch has a problem of a high insertion loss, and this limits application of the silicon-based waveguide optical switch.

Therefore, implementing the optical switch matrix with a microsecond-level switching speed, a low insertion loss, a large quantity of ports, and low costs is an important part of future development of an all-optical switching technology.

SUMMARY

This application provides an optical switch and an optical switching system. The optical switch and the optical switching system have a high switching speed and a low loss.

According to a first aspect, this application provides an optical switch, where the optical switch is disposed on a substrate, and the optical switch includes a first waveguide, a second waveguide, a first deformable waveguide, and a first actuator; the first waveguide is immovable relative to the substrate, and the first waveguide has a first input port IP1 and a first output port OP1; the second waveguide is immovable relative to the substrate, the second waveguide has a second output port OP2, and the first waveguide and the second waveguide are located in a first plane; the first deformable waveguide is also located in the first plane, a first section of the first deformable waveguide is fixed relative to the substrate, and a second section other than the first section can deform under control of the first actuator; when the first deformable waveguide is in a first state, (1) the first deformable waveguide and the first waveguide are optically decoupled, and the first deformable waveguide and the second waveguide are optically decoupled; and (2) the IP1 and the OP1 are optically connected, and the IP1 and the OP2 are optically blocked; when the first deformable waveguide is in a second state, (1) the first deformable waveguide and the first waveguide are optically coupled, and the first deformable waveguide and the second waveguide are optically coupled; and (2) the IP1 and the OP1 are optically blocked, and the IP1 and the OP2 are optically connected by using the first deformable waveguide; and the first state is a natural state or a first deformed state of the first deformable waveguide, the second state is a natural state or a second deformed state of the first deformable waveguide, and the first state and the second state are not the natural state at the same time.

When the first deformable waveguide is in the first state, the optical switch may be considered to be in a through (Through) state; and when the first deformable waveguide is in the second state, the optical switch may be considered to be in a drop (Drop) state.

Optionally, the first deformable waveguide of the optical switch in the first aspect of this application may be a MEMS optical waveguide.

Optionally, the first plane of the optical switch in the first aspect of this application may be a plane parallel with the substrate.

According to the optical switch in the first aspect of this application, the first section of the first deformable waveguide is fixed, and a remaining section deforms by virtue of toughness of the optical waveguide, so as to change a status of the optical switch. In this way, a weight carried by the actuator can be reduced, and a switching speed of the optical switch can be increased by changing the status of the optical switch by virtue of the deformation, thereby improving performance of the optical switch.

In a possible implementation of the first aspect, the first section includes a first fixing point located at a middle location of the first deformable waveguide.

In a possible implementation of the first aspect, the first section further includes a second fixing point and a third fixing point that are located at two ends of the first deformable waveguide. According to a system requirement, waveguide performance, a mode and power of an optical signal, an actuation principle of the actuator, and the like, a quantity of fixing points is not limited.

In a possible implementation of the first aspect, the first actuator is connected to the second section of the first deformable waveguide by using a cantilever.

In another possible implementation of the first aspect, the first actuator is parallel-plate electrodes. In a specific implementation, the first deformable waveguide is grounded, a voltage may be applied to the electrodes, and a voltage difference between the electrodes and the first deformable waveguide causes the first deformable waveguide to deform. In this possible implementation, the actuator controls gaps between the first deformable waveguide and the fixed waveguides by using the parallel-plate electrodes, to form a lateral coupler. Compared with a comb electrostatic actuator, the actuator has a higher switching speed, and the switching speed may reach 1 microsecond or less. In this way, performance of the optical switch can be further improved.

In a possible implementation of the first aspect, the first waveguide and the second waveguide may intersect. Both the first waveguide and the second waveguide may be straight waveguides, and the first deformable waveguide may be a curved waveguide.

In another possible implementation of the first aspect, the first waveguide and the second waveguide may not intersect, both the first waveguide and the second waveguide may be curved waveguides, and the first deformable waveguide may be a straight waveguide.

In a possible implementation of the first aspect, the optical switch is a 1×2 optical switch; the second section includes a first input section and a first output section; and when the first deformable waveguide is in the second state, the first input section of the first deformable waveguide and the first waveguide form a first coupler, and the first output section of the first deformable waveguide and the second waveguide form a second coupler.

Because of the first coupler, the IP1 and the OP1 are optically blocked; and because of the second coupler, the IP1 and the OP2 are optically connected.

In a possible implementation of the first aspect, the first coupler may be set as follows: along a transmission direction of an optical signal, a curvature degree change of the first waveguide of the first coupler is less than a first threshold, and a curvature degree change of the first input section of the first deformable waveguide of the first coupler is less than a second threshold. In this possible implementation, the first input section of the first deformable waveguide and the first waveguide are coupled on a straight waveguide as much as possible, so that an optical signal loss at the coupler can be reduced.

In a possible implementation of the first aspect, the optical switch is a 2×2 optical switch; the second waveguide further has a second input port IP2; the optical switch further includes a second deformable waveguide, a third section of the second deformable waveguide is fixed relative to the substrate, and a fourth section other than the third section can deform under control of a second actuator; when the second deformable waveguide is in a third state, (1) the second deformable waveguide and the first waveguide are optically decoupled, and the second deformable waveguide and the second waveguide are optically decoupled; and (2) the IP2 and the OP2 are optically connected, and the IP2 and the OP1 are optically blocked; when the second deformable waveguide is in a fourth state, (1) the second deformable waveguide and the first waveguide are optically coupled, and the second deformable waveguide and the second waveguide are optically coupled; and (2) the IP2 and the OP2 are optically blocked, and the IP2 and the OP1 are optically connected by using the second deformable waveguide; and the third state is a natural state or a third deformed state of the second deformable waveguide, the fourth state is a natural state or a fourth deformed state of the second deformable waveguide, and the third state and the fourth state are not the natural state at the same time.

In a possible implementation of the first aspect, along the transmission direction of the optical signal, an effective refractive index of the first input section of the first coupler gradually increases, and an effective refractive index of the first output section of the second coupler gradually decreases. A specific implementation may be that, along the transmission direction of the optical signal, a width of the first input section of the first coupler gradually increases, and a width of the first output section of the second coupler gradually decreases. Because an effective refractive index of a waveguide gradually changes or a width of the waveguide gradually changes, transmission in a relatively wide spectral range can be implemented, and an optical signal is more stable. In addition, a process tolerance of a coupler can be improved, and performance of the optical switch can be improved.

Further, along the transmission direction of the optical signal, an effective refractive index of the first waveguide of the first coupler may gradually decrease, and an effective refractive index of the second waveguide of the second coupler may gradually increase.

In a possible implementation of the first aspect, the optical switch further includes an optical power monitor, and the optical power monitor is configured to monitor optical power of at least one of the first waveguide, the second waveguide, the IP1, the OP1, and the OP2. The optical switch in this possible implementation monitors power of an optical signal in each element, so as to estimate a location of the first deformable waveguide based on the power of the optical signal, thereby controlling the location of the first deformable waveguide more accurately.

According to a second aspect, this application provides an optical switching system, where the optical switching system is an M×N optical switch matrix, including M×N optical switches in a corresponding implementation of the first aspect; the second waveguide of the optical switch further has a second input port IP2, and the first waveguide and the second waveguide intersect; each optical switch is denoted as $SC_{i,j}$, where a value of i is 1, 2, ..., M, and a value of j is 1, 2, ..., N; and the M×N optical switches are set as follows: (1) an $IP1_{i,j}$ and an $OP1_{i,j-1}$ are optically connected; and (2) an $IP2_{i,j}$ and an $OP_{i-1,j}$ are optically connected, where a value range of i is 2 to M, and a value range of j is 2 to N.

In a possible implementation of the second aspect, at least one path that includes only one optical switch whose first deformable waveguide is in a second state exists between an $IP1_{i,1}$ and an $OP2_{M,j}$, where a value range of i is 1 to M, and a value range of j is 1 to N.

In a possible implementation of the second aspect, the optical switch is an optical switch that further includes a second deformable waveguide in the first aspect, and at least one path that includes only one optical switch whose second deformable waveguide is in a fourth state exists between an $IP2_{1,j}$ and an $OP1_{i,N}$.

According to a third aspect, this application provides an optical switching system, where the optical switching system is an M×N optical switch matrix, including M×N optical switches in a corresponding implementation of the first aspect; the second waveguide of the optical switch further has a second input port IP2, and the first waveguide and the second waveguide do not intersect; each optical switch is denoted as $SC_{i,j}$, where a value of i is 1, 2, . . . , M, and a value of j is 1, 2, . . . , N; and the M×N optical switches are set as follows: (1) an $IP1_{i,j}$ and an $OP2_{i,j-1}$ are optically connected; and (2) an $IP2_{i,j}$ and an $OP1_{i-1,j}$ are optically connected, where a value range of i is 2 to M, and a value range of j is 2 to N.

In a possible implementation of the third aspect, at least one path that includes only one optical switch whose first deformable waveguide is in a first state exists between an $IP1_{i,1}$ and an $OP1_{M,j}$, where a value range of i is 1 to M, and a value range of j is 1 to N.

In a possible implementation of the third aspect, the optical switch is an optical switch that further includes a second deformable waveguide in the first aspect, and at least one path that includes only one optical switch whose second deformable waveguide is in a third state exists between an $IP2_{1,j}$ and an $OP_{i,N}$.

The optical switching system in the second aspect and the third aspect can implement a microsecond-level switching speed and has advantages such as a low insertion loss, a large quantity of ports, and low costs.

It should be understood that, that a waveguide X and a waveguide Y are optically coupled (optically coupled) means that the waveguide X and the waveguide Y move close to each other, so that optical fields of the two waveguides affect each other and light energy is transferred between the two waveguides. That the waveguide X and the waveguide Y are optically decoupled (optically decoupled) means that the waveguide X and the waveguide Y move away from each other, so that the optical fields of the two waveguides do not affect each other and no light energy is transferred between the two waveguides. Certainly, it is inevitable that, when the waveguide X and the waveguide Y are optically decoupled, the optical fields of the two waveguides may still slightly affect each other, and a small amount of light energy may be transferred between the two waveguides in a form of crosstalk. It would be better if such crosstalk is lower.

It should be further understood that, that an input port A and an output port B are optically connected means that an optical signal channel is established between the input port A and the output port B. Certainly, it is inevitable that, when the input port A and the output port B are optically connected, a small amount of light may be output from another output port different from the output port B in a form of crosstalk, or a small amount of light may be transmitted from another input port different from the input port A to the output port B in a form of crosstalk. It would be better if such crosstalk is lower.

It should be further understood that, that the input port A and the output port B are optically blocked means that no optical signal channel exists between the input port A and the output port B. Certainly, it is inevitable that, when the input port A and the output port B are optically blocked, a small amount of light may be transmitted from the input port A to the output port B in a form of crosstalk. Likewise, it would be better if such crosstalk is lower.

It should be further understood that the effective refractive index (effective refractive index) may also be referred to as an equivalent refractive index and may be denoted as $n_{eff}$, where $n_{eff}=\beta/(2\pi/\lambda)$, $\beta$ is a propagation constant of an optical field mode of a waveguide, and $\lambda$ is a light wavelength in vacuum.

DESCRIPTION OF EMBODIMENTS

The following describes the technical solutions in this application with reference to the accompanying drawings.

As mentioned in the foregoing description, to implement an optical switch matrix with a microsecond-level switching speed and a low insertion loss, the prior art provides a MEMS optical switch.

Figure 1:
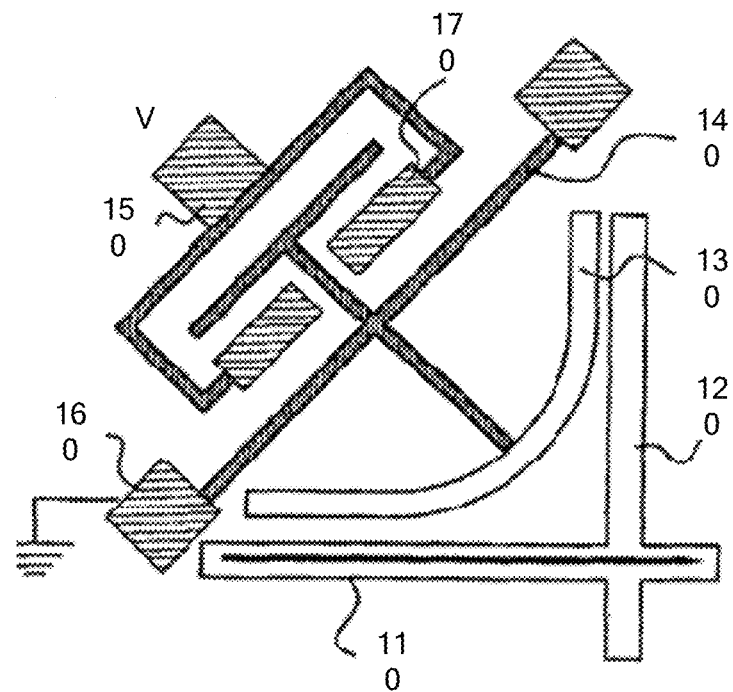
FIG. 1 and FIG. 2 are schematic diagrams of an existing optical switch in a through state and a drop state, respectively.
Figure 2:
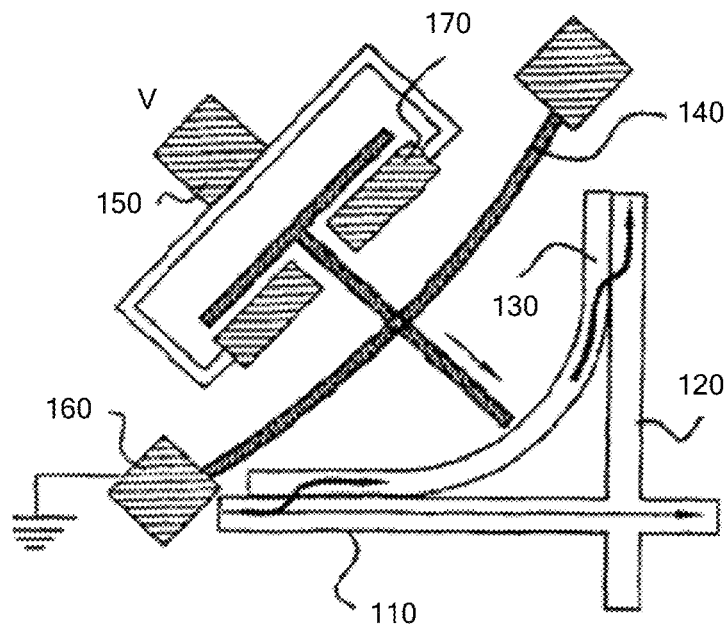

FIG. 1 is a top view of an existing silicon-based MEMS optical switch 100 in a through (Through) state. FIG. 2 is a top view of the optical switch 100 in a drop (Drop) state. The optical switch 100 includes a horizontal input optical waveguide 110, a vertical output optical waveguide 120, and a curved optical waveguide 130. The horizontal input optical waveguide 110, the vertical output optical waveguide 120, and the curved optical waveguide 130 are located in a same plane, and the horizontal input optical waveguide 110 and the vertical output optical waveguide 120 perpendicularly intersect and are fixed. The curved optical waveguide 130 is supported by using a flexible cantilever 140. Two ends of the cantilever 140 are close to the horizontal input optical waveguide 110 and the vertical output optical waveguide 120. The cantilever 140 is a support arm in silicon materials. A surface of the cantilever 140 is covered with metal or a body of the cantilever 140 is heavily doped, and the two ends of the cantilever 140 are connected to electrodes 160 in a fixed manner, to conduct static electricity. The other side of the cantilever 140 is close to electrodes 170. The electrodes 170 are connected to an electrode 150 by using a fixed nanoscale silicon arm, to form an actuator. When no bias voltage is applied between the electrode 150 (or the electrodes 170) and the electrodes 160, no electrostatic attraction exists between an end of the cantilever 140 that is not connected to the curved optical waveguide 130 and the electrodes 170, and the cantilever does not deform. The curved optical waveguide 130 stays still at a location far away from the horizontal input optical waveguide 110 and the vertical output optical waveguide 120. An input optical signal passes through the cross waveguide along the horizontal input optical waveguide 110 and is output from a right end of the horizontal input optical waveguide 110. When a bias voltage V is applied between the electrode 150 (or the electrodes 170) and the electrodes 160, electrostatic attraction is generated between the end of the cantilever 140 that is not connected to the curved optical waveguide 130 and the electrodes 170, and a gap between the end of the cantilever 140 that is not connected to the curved optical waveguide 130 and the electrodes 170 decreases, causing the cantilever 140 to deform. The cantilever drives the curved optical waveguide 130 to move close to the horizontal input optical waveguide 110 and the vertical output optical waveguide 120. When gaps between two ends of the curved optical waveguide 130, and the horizontal input optical waveguide 110 and the vertical output optical waveguide 120 decrease, a lateral coupler is formed. An input optical signal is coupled into the curved optical waveguide 130 through the horizontal input optical waveguide 110, and is coupled into an upper port of the vertical output optical waveguide 120 through the other end of the curved optical waveguide 130 for outputting, thereby implementing switching of the optical signal. A switching time of the optical switch 100 can reach a microsecond level.

Optical switches 100 may form an optical switch matrix with a large quantity of ports. The optical switch matrix has an optical switch 100 at each crosspoint. The optical switch matrix can switch a plurality of input optical signals to any drop port (Drop port) or a corresponding through port (Through port).

In the lateral coupler in a structure of the optical switch 100, a gap between the horizontal input optical waveguide 110 and the curved optical waveguide 130 and a gap between the vertical output optical waveguide 120 and the curved optical waveguide 130 are highly sensitive to a voltage applied to the actuator. In addition, considering a mechanical vibration eigenfrequency of the curved optical waveguide 130, intensity of light output from a drop port of the lateral coupler may fluctuate with a change of the gaps between the optical waveguides, affecting performance of the optical switch. The lateral coupler is based on a principle of a directional coupler, and coupling efficiency of the coupler is sensitive to a wavelength. Therefore, optical bandwidth of the optical switch 100 is relatively narrow, and an application scenario of the optical switch 100 is limited. In addition, to control the gap between the horizontal input optical waveguide 110 and the curved optical waveguide 130 and the gap between the vertical output optical waveguide 120 and the curved optical waveguide 130 in the lateral coupler, a comb actuator is used in the optical switch 100. A voltage change process of the comb actuator causes a decrease in a switching speed of the optical switch, affects the performance of the optical switch, and limits the application scenario of the optical switch.

Figure 3:
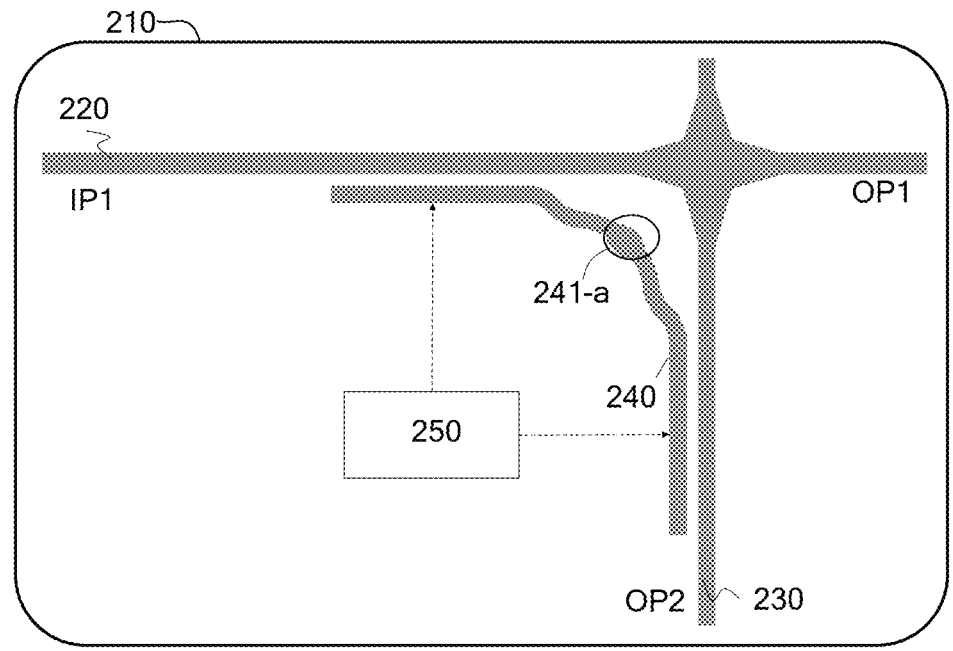
FIG. 3 is a schematic structural block diagram of a top view of an optical switch according to an embodiment of this application.

In view of the foregoing problems, an embodiment of this application provides a microsecond-level optical switch 200 having a low insertion loss. As shown in FIG. 3, the optical switch 200 is disposed on a substrate 210. The optical switch 200 includes a first waveguide 220, a second waveguide 230, a first deformable waveguide 240, and a first actuator 250. The first waveguide 220 is immovable relative to the substrate 210, and the first waveguide 220 has a first input port IP1 and a first output port OP1. The second waveguide 230 is immovable relative to the substrate 210, and the second waveguide 230 has a second output port OP2. The first waveguide 220 and the second waveguide 230 are located in a first plane. The first deformable waveguide 240 is also located in the first plane. A first section 241 of the first deformable waveguide 240 is fixed relative to the substrate 210, and a second section 242 other than the first section 241 can deform under control of the first actuator 250.

When the first deformable waveguide 240 is in a first state, (1) the first deformable waveguide 240 and the first waveguide 220 are optically decoupled, and the first deformable waveguide 240 and the second waveguide 230 are optically decoupled; and (2) the IP1 and the OP1 are optically connected, and the IP1 and the OP2 are optically blocked. When the first deformable waveguide 240 is in a second state, (1) the first deformable waveguide 240 and the first waveguide 220 are optically coupled, and the first deformable waveguide 240 and the second waveguide 230 are optically coupled; and (2) the IP1 and the OP1 are optically blocked, and the IP1 and the OP2 are optically connected by using the first deformable waveguide 240. The first state is a natural state or a first deformed state of the first deformable waveguide 240, the second state is a natural state or a second deformed state of the first deformable waveguide 240, and the first state and the second state are not the natural state at the same time.

It may be considered that, when the first deformable waveguide 240 is in the first state, the optical switch is in a through (Through) state; and when the first deformable waveguide 240 is in the second state, the optical switch is in a drop (Drop) state.

Optionally, the first deformable waveguide of the optical switch in this embodiment of this application may be a MEMS optical waveguide.

Optionally, the first plane in this embodiment of this application may be a plane parallel with the substrate 210.

It should be understood that sizes and shapes of the substrate 210, the first waveguide 220, the second waveguide 230, and the first deformable waveguide 240, a quantity and locations of first actuators 250, and locations and directions of the IP1, the OP1, and the OP2 that are shown in FIG. 3 are all examples and constitute no limitation on this embodiment of this application. For brevity, the substrate 210 is omitted and not shown in embodiments of FIG. 4 to FIG. 20 in this application. The first waveguide 220 and the second waveguide 230 are immovable waveguides or are referred to as fixed waveguides. The first deformable waveguide 240 and a second deformable waveguide 260 that is to be mentioned below are deformable waveguides.

According to the optical switch in this embodiment of this application, the first section of the first deformable waveguide is fixed, and a remaining section deforms by virtue of toughness of the optical waveguide, so as to change a status of the optical switch. In this way, a weight carried by the actuator can be reduced, and a switching speed of the optical switch can be increased by changing the status of the optical switch by virtue of the deformation, thereby improving performance of the optical switch.

According to the optical switch in this embodiment of this application, the status of the optical switch is not changed by virtue of a mechanical movement of the optical waveguide, but is changed by virtue of the deformation.

It should be understood that, in this embodiment of this application, the first state of the first deformable waveguide of the optical switch may correspond to the natural state of the first deformable waveguide, and the second state of the first deformable waveguide may correspond to a deformed state of the first deformable waveguide; or the first state of the first deformable waveguide of the optical switch may correspond to a deformed state of the first deformable waveguide, and the second state of the first deformable waveguide may correspond to the natural state of the first deformable waveguide; or the first state and the second state of the first deformable waveguide of the optical switch may correspond to different degrees of deformed states (the first deformed state and the second deformed state) of the first deformable waveguide, respectively. This is not limited in this embodiment of this application.

Alternatively, the through state of the optical switch may correspond to the natural state of the first deformable waveguide, and the drop state may correspond to a deformed state of the first deformable waveguide; or the through state of the optical switch may correspond to a deformed state of the first deformable waveguide, and the drop state may correspond to the natural state of the first deformable waveguide; or the through state and the drop state of the optical switch may correspond to different degrees of deformed states (the first deformed state and the second deformed state) of the first deformable waveguide, respectively. This is not limited in this embodiment of this application.

In this embodiment of this application, the natural state is relative to a deformed state and is a state of the waveguide when the waveguide is not affected by an actuation signal of the actuator.

It should be understood that, in this embodiment of this application, that a waveguide X and a waveguide Y are optically coupled (optically coupled) means that the waveguide X and the waveguide Y move close to each other, so that optical fields of the two waveguides affect each other and light energy is transferred between the two waveguides. That the waveguide X and the waveguide Y are optically decoupled (optically decoupled) means that the waveguide X and the waveguide Y move away from each other, so that the optical fields of the two waveguides do not affect each other and no light energy is transferred between the two waveguides. Certainly, it is inevitable that, when the waveguide X and the waveguide Y are optically decoupled, the optical fields of the two waveguides may still slightly affect each other, and a small amount of light energy may be transferred between the two waveguides in a form of crosstalk. It would be better if such crosstalk is lower.

It should be further understood that, that an input port A and an output port B are optically connected means that an optical signal channel is established between the input port A and the output port B. Certainly, it is inevitable that, when the input port A and the output port B are optically connected, a small amount of light may be output from another output port different from the output port B in a form of crosstalk, or a small amount of light may be transmitted from another input port different from the input port A to the output port B in a form of crosstalk. It would be better if such crosstalk is lower.

It should be further understood that, that the input port A and the output port B are optically blocked means that no optical signal channel exists between the input port A and the output port B. Certainly, it is inevitable that, when the input port A and the output port B are optically blocked, a small amount of light may be transmitted from the input port A to the output port B in a form of crosstalk. Likewise, it would be better if such crosstalk is lower.

Optionally, the first deformable waveguide 240 and the first waveguide 220 being optically decoupled and the first deformable waveguide 240 and the second waveguide 230 being optically decoupled may be results achieved simultaneously when the first deformable waveguide 240 is adjusted and controlled to be at a first location, instead of being separately implemented in two steps. Likewise, the first deformable waveguide 240 and the first waveguide 220 being optically coupled and the first deformable waveguide 240 and the second waveguide 230 being optically coupled may be results achieved simultaneously, instead of being separately implemented in two steps. Details are not described.

Optionally, as shown in FIG. 3, in an embodiment of this application, both the first waveguide 220 and the second waveguide 230 may be straight waveguides, and the first deformable waveguide 240 may be a curved waveguide. The first waveguide 220 and the second waveguide may intersect. Preferably, the first waveguide 220 and the second waveguide may perpendicularly intersect.

Optionally, for the first deformable waveguide 240, the first section 241 may include a first fixing point 241-*a* at a middle location of the first deformable waveguide 240, as shown in FIG. 3. It should be understood that the middle location refers to a range in the middle of the first deformable waveguide 240. The range in the middle of the first deformable waveguide 240 may include one first fixing point 241-*a*. This can ensure that the first deformable waveguide 240 does not move relative to the substrate 210. When the first actuator 250 affects the first deformable waveguide 240, the first deformable waveguide 240 deforms. In addition, the range in the middle of the first deformable waveguide 240 may include two first fixing points that are located at two ends of the range. It should be understood that, because most current fabrication processes of the optical switch are processes based on a corrosion technology, a process of disposing the first fixing point 241-*a* at the middle location of the first deformable waveguide 240 is relatively simple.

Figure 11:
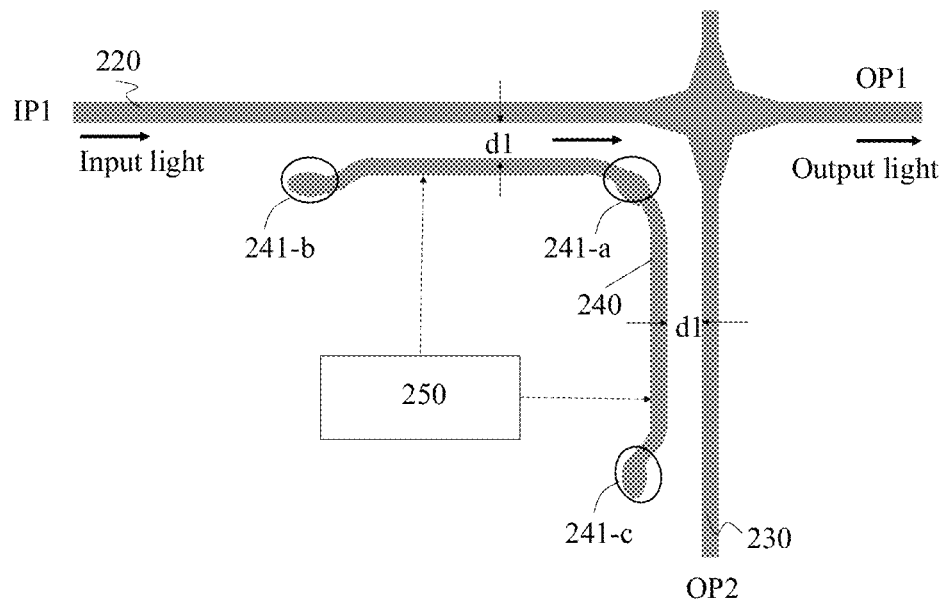
FIG. 11 is a schematic block diagram of an optical switch in a through state according to another embodiment of this application.
Figure 12:
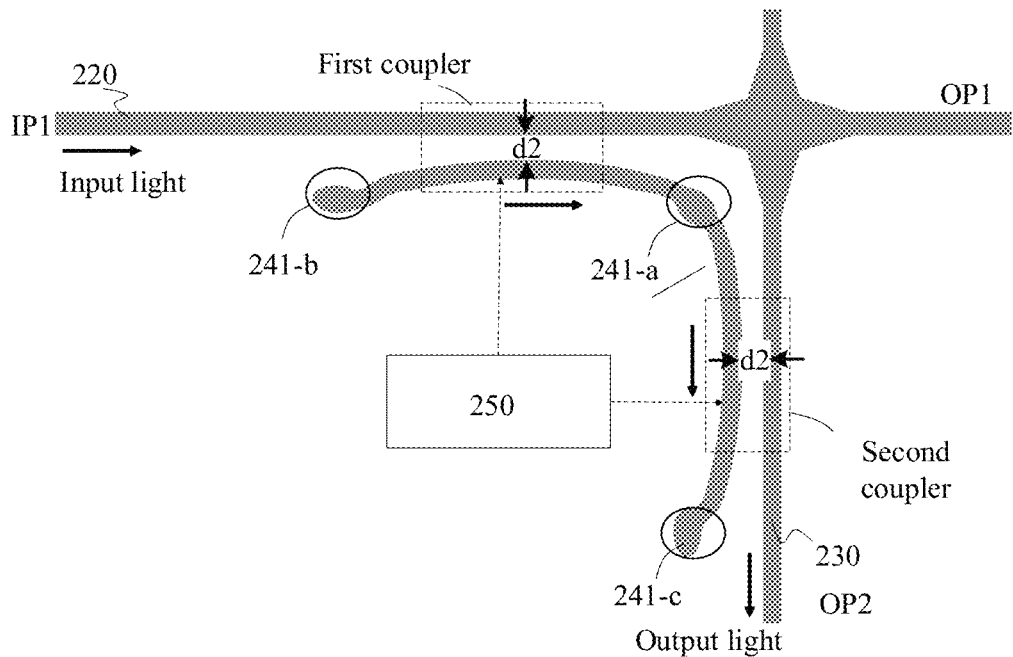
FIG. 12 is a schematic block diagram of an optical switch in a drop state according to another embodiment of this application.

Further, according to a system requirement, waveguide performance, a mode and power of an optical signal, an actuation principle of the actuator, and the like, the first section 241 may further include a second fixing point 241-*b* and a third fixing point 241-*c* that are located at two ends of the first deformable waveguide 240, as shown in FIG. 11 and FIG. 12.

Figure 4:
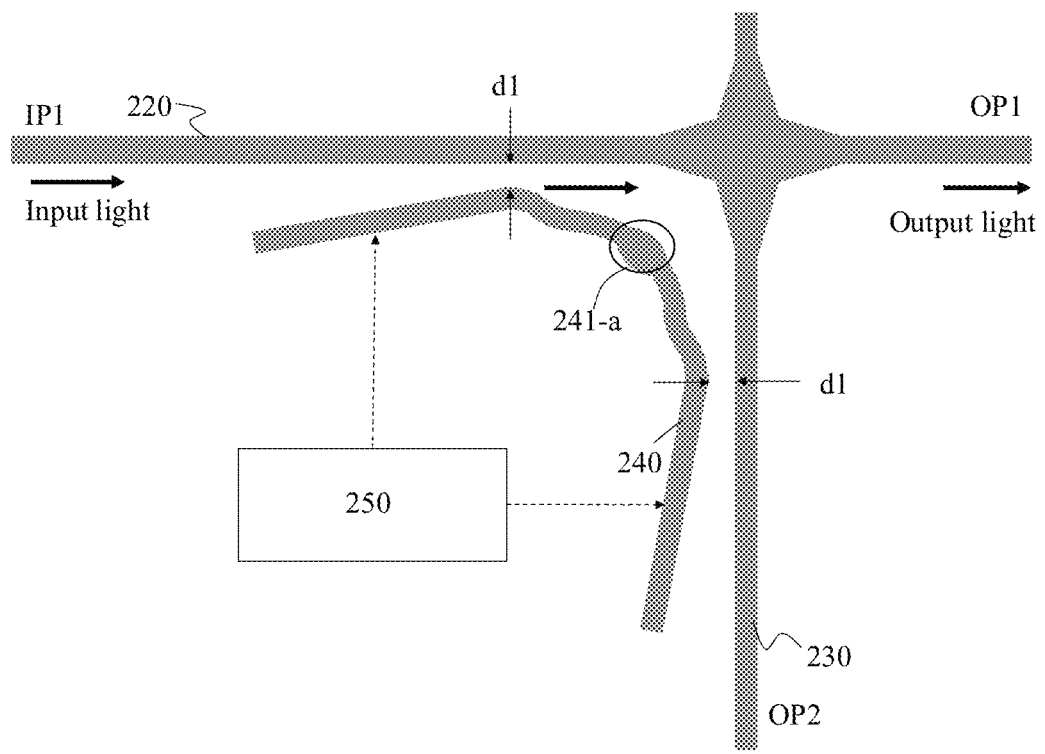
FIG. 4 is a schematic block diagram of an optical switch in a through state according to an embodiment of this application.
Figure 5:
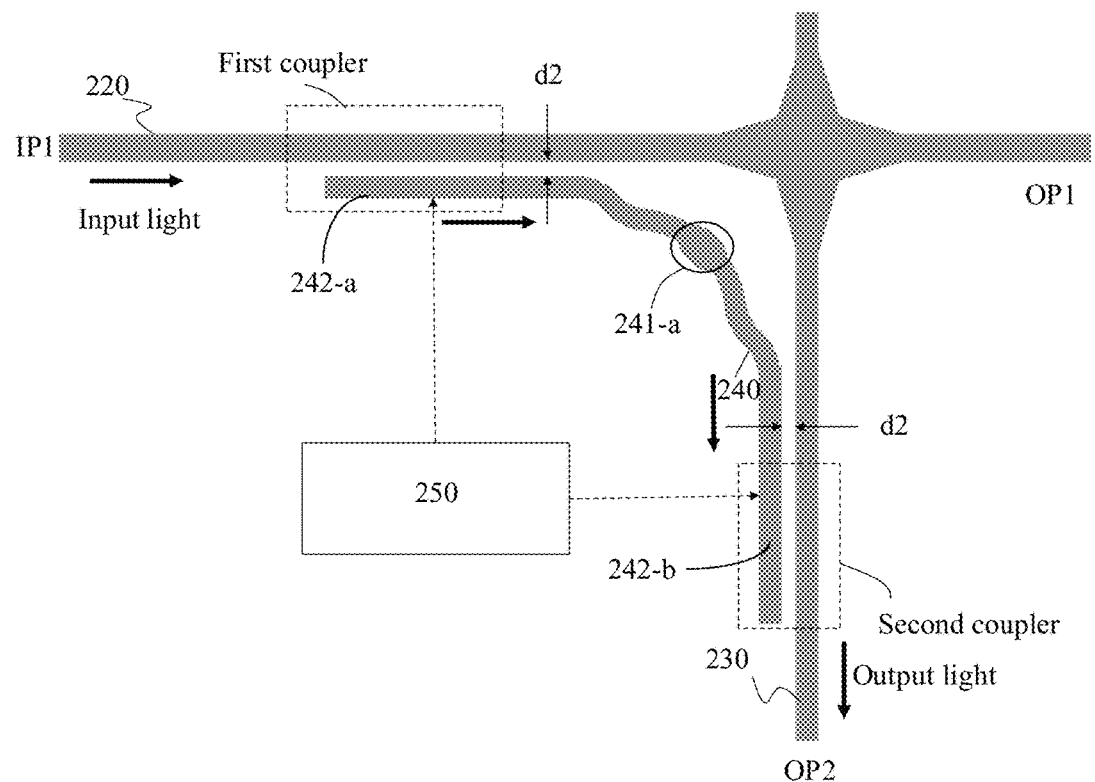
FIG. 5 is a schematic block diagram of an optical switch in a drop state according to an embodiment of this application.

Optionally, in an embodiment of this application, the first actuator 250 may be connected to the second section of the first deformable waveguide 240 by using a cantilever, as shown in FIG. 3, FIG. 4, and FIG. 5. The first actuator 250 drives, by using the cantilever under additional excitation such as excitation of an electric field, a magnetic field, an optical field, or a thermal field, the first deformable waveguide 240 to deform and move relative to the immovable waveguides. For example, the first actuator 250 may be a comb electrostatic actuator. Locations and a quantity of disposed actuators are not limited in this embodiment of this application. The cantilever may be a spring, may be another component in elastic materials, or may be an inelastic connection component. This is not limited in this embodiment of this application. In this application, the first actuator 250 is not limited to the foregoing form. A relationship between the first actuator 250 and the first deformable waveguide 240 is also not limited to the foregoing connection form, and another form is described below.

FIG. 4 is a schematic diagram of the optical switch shown in FIG. 3 in a through (Through) state. The cantilever of the first actuator 250 drives the two ends of the first deformable waveguide 240 to deform to a location with a minimum gap of d1 from an input side of the first waveguide 220 and an output side of the second waveguide 230. The first deformable waveguide 240 and the two immovable waveguides cannot be optically coupled due to a long distance. In this case, the first deformable waveguide 240 is in the first state (the first state shown in FIG. 4 is the first deformed state of the first deformable waveguide 240 after the deformation), and the optical switch is in the through (Through) state. The IP1 and the OP1 are optically connected, and the IP1 and the OP2 are optically blocked. Input light is input from the first input port IP1 of the first waveguide 220 and is transmitted in the first waveguide 220, and output light is output from the first output port OP1 of the first waveguide 220.

FIG. 5 is a schematic diagram of the optical switch shown in FIG. 3 in a drop (Drop) state. The first actuator 250 does not work. The first deformable waveguide 240 is in the natural state, and the first deformable waveguide 240 is at a location with a minimum gap of d2 from the input side of the first waveguide 220 and the output side of the second waveguide 230, where d1 is greater than d2. The first deformable waveguide 240 and the two immovable waveguides are optically coupled. In this case, the first deformable waveguide 240 is in the second state (the second state shown in FIG. 5 is the natural state of the first deformable waveguide 240), and the optical switch is in the drop (Drop) state. The IP1 and the OP1 are optically blocked, and the IP1 and the OP2 are optically connected by using the first deformable waveguide 240. Input light is input from the first input port IP1 of the first waveguide 220. Because the first deformable waveguide 240 and the first waveguide 220 are optically coupled, an optical signal is coupled into the first deformable waveguide 240 for transmission. Further, because the first deformable waveguide 240 and the second waveguide 230 are optically coupled, the optical signal is coupled into the second waveguide 230 for transmission. Finally, output light is output from the second output port OP2 of the second waveguide 230.

Specifically, as shown in FIG. 5, the second section 242 of the first deformable waveguide 240 in this embodiment of this application may include a first input section 242-a and a first output section 242-b. When the first deformable waveguide 240 is in the second state, the first input section 242-a of the first deformable waveguide 240 and the first waveguide 220 form a first coupler, and the first output section 242-b of the first deformable waveguide 240 and the second waveguide 230 form a second coupler. Because of the first coupler, the IP1 and the OP1 are optically blocked; and because of the second coupler, the IP1 and the OP2 are optically connected. The input light is input from the first input port IP1 of the first waveguide 220. The optical signal is coupled by the first coupler into the first input section 242-a of the first deformable waveguide 240 for transmission and is coupled by the second coupler from the first output section 242-b of the first deformable waveguide 240 into the second waveguide 230 for transmission. Finally, the output light is output from the second output port OP2 of the second waveguide 230.

It should be understood that the first state shown in FIG. 4 is the first deformed state of the first deformable waveguide 240 after the deformation and that the second state shown in FIG. 5 is the natural state of the first deformable waveguide 240. These are merely examples. As described above, there may also be the following cases: The first state is the natural state of the first deformable waveguide 240, and the second state is the second deformed state of the first deformable waveguide 240 after the deformation; or the first state is the first deformed state of the first deformable waveguide 240 after the deformation, and the second state is the second deformed state of the first deformable waveguide 240 after the deformation. Details are not described herein.

Optionally, the first coupler may be set as follows: Along a transmission direction of the optical signal, a curvature degree change of the first waveguide of the first coupler is less than a first threshold, and a curvature degree change of the first input section of the first deformable waveguide of the first coupler is less than a second threshold. That is, the first input section 242-a of the first deformable waveguide 240 and the first waveguide 220 are coupled on a straight waveguide as much as possible, so that an optical signal loss at the coupler can be reduced. The first threshold may be or may not be equal to the second threshold, and a value may be 5°, 10°, 15°, or 20°. A specific value may be determined based on a system requirement, waveguide performance, a mode and power of an optical signal mode, and the like. This is not limited in this embodiment of this application. Likewise, the second coupler may also be designed similarly. This is not limited in this embodiment of this application.

Optionally, in this embodiment of this application, along the transmission direction of the optical signal, an effective refractive index of the first input section and/or an effective refractive index of the first waveguide of the first coupler may gradually change, and an effective refractive index of the first output section and/or an effective refractive index of the second waveguide of the second coupler may gradually change.

It should be understood that the effective refractive index (effective refractive index) may also be referred to as an equivalent refractive index and may be denoted as $n_{eff}$, where $n_{eff}=\beta/(2\pi/\lambda)$, $\beta$ is a propagation constant of an optical field mode of a waveguide, and $\lambda$ is a light wavelength in vacuum.

Specifically, an effective refractive index of a waveguide may be adjusted by changing a cross-section structure (for example, a width, a height, and a shape) of the waveguide. A cross section of an existing optical waveguide is usually rectangular, and an effective refractive index of the waveguide may be adjusted by changing a width of the waveguide. For example, along the transmission direction of the optical signal, a width of the first input section and/or a width of the first waveguide of the first coupler may gradually change, and a width of the first output section and/or a width of the second waveguide of the second coupler may gradually change.

Figure 6:
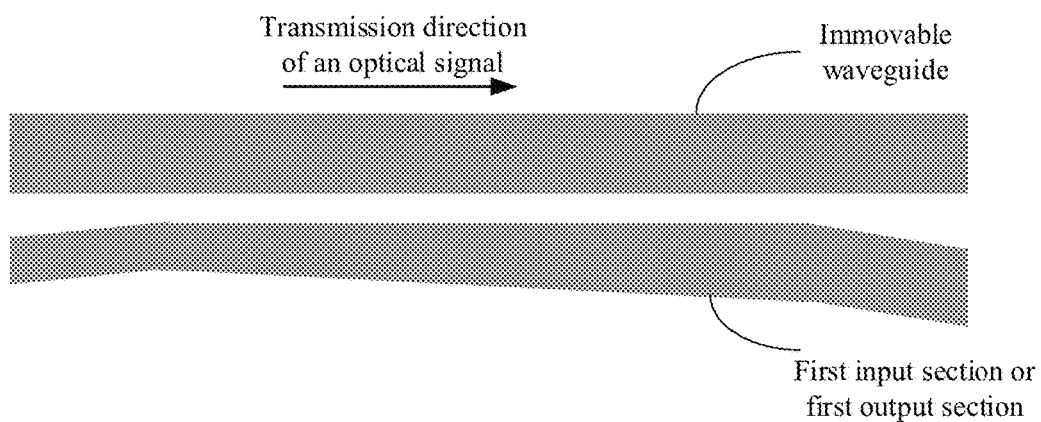
FIG. 6, FIG. 7, and FIG. 8 are schematic structural diagrams of a coupler according to an embodiment of this application.
Figure 7:
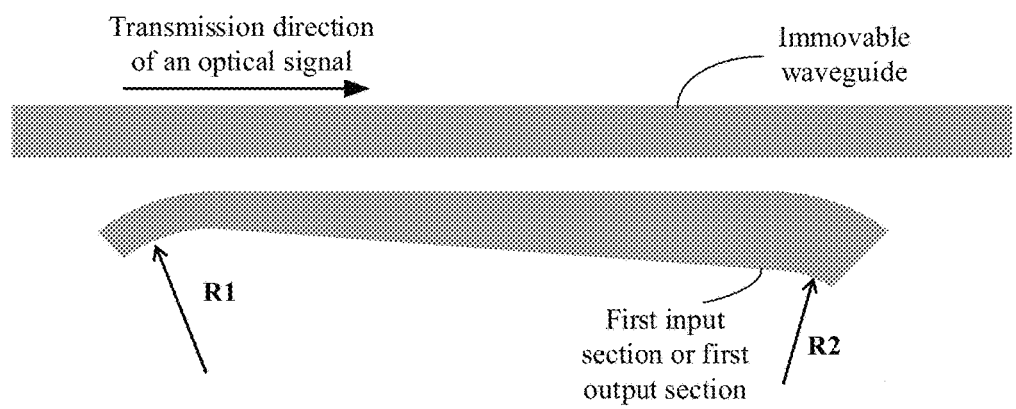

For couplers shown in FIG. 6 and FIG. 7, along a transmission direction of an optical signal, a width of an input section or an output section of a first deformable waveguide gradually changes, and widths of a first waveguide and a second waveguide are constant widths. Optionally, in an embodiment, along the transmission direction of the optical signal, the effective refractive index of the first input section of the first coupler gradually increases, and the effective refractive index of the first output section of the second coupler gradually decreases. Correspondingly, along the transmission direction of the optical signal, the width of the first input section of the first coupler gradually increases, and the width of the first output section of the second coupler gradually decreases.

The input section or the output section of the first deformable waveguide in the coupler shown in FIG. 6 is formed by using a straight waveguide. The input section or the output section of the first deformable waveguide in the coupler shown in FIG. 7 is formed by connecting an arc-shaped waveguide and a straight waveguide. In an example in FIG. 7, the input section or the output section of the first deformable waveguide has an arc-shaped waveguide at both a location of entering the coupler and a location of leaving the coupler, and arc radii are R1 and R2, respectively. It should be understood that FIG. 7 is merely an example. The input section or the output section of the first deformable waveguide may have the arc-shaped waveguide (whose radius is R1) only at the location of entering the coupler, or have the arc-shaped waveguide (whose radius is R2) only at the location of leaving the coupler. This is not limited in this embodiment of this application.

Figure 8:
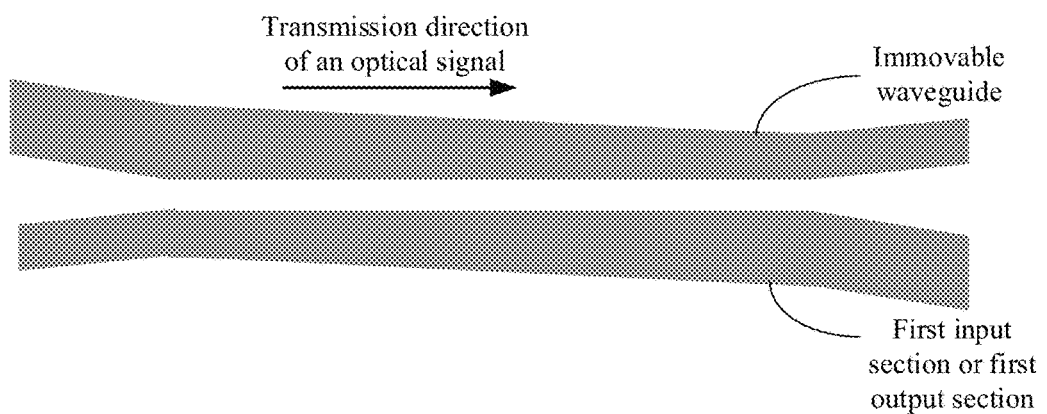

For a coupler shown in FIG. 8, along a transmission direction of an optical signal, a width of an input section or an output section of a first deformable waveguide gradually changes, and a width of an immovable waveguide also gradually changes. The width of the input section or the output section in FIG. 6 to FIG. 8 gradually increases, and the width of the immovable waveguide in FIG. 8 gradually decreases. Certainly, for optical signals in different modes, the width of the input section or the output section may gradually decrease, and the width of the immovable waveguide gradually increases. This is not limited in this embodiment of this application. Optionally, in an embodiment, along the transmission direction of the optical signal, the effective refractive index of the first input section of the first coupler gradually increases, and the effective refractive index of the first output section of the second coupler gradually decreases; and the effective refractive index of the first waveguide of the first coupler gradually decreases, and the effective refractive index of the second waveguide of the second coupler gradually increases. Correspondingly, along the transmission direction of the optical signal, the width of the first input section of the first coupler gradually increases, and the width of the first output section of the second coupler gradually decreases; and the width of the first waveguide of the first coupler gradually decreases, and the width of the second waveguide of the second coupler gradually increases.

The width of the waveguide in FIG. 6 to FIG. 8 is merely an example, but not a limitation on this embodiment of this application. Because a width of a waveguide in a coupler gradually changes, transmission in a relatively wide spectral range can be implemented, and an optical signal is more stable. In addition, a process tolerance of the coupler can be improved, and performance of the optical switch can be improved.

Figure 9:
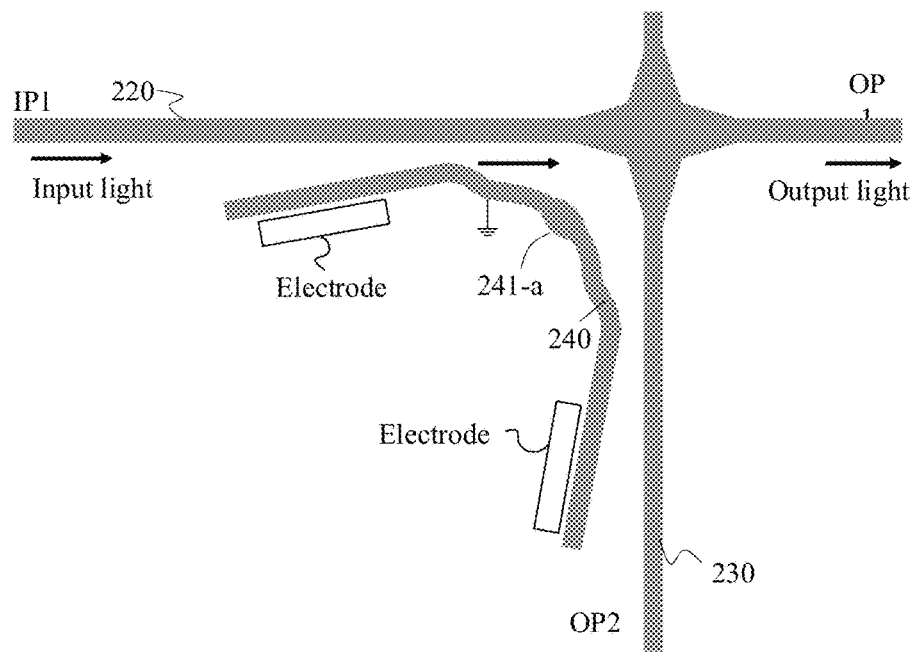
FIG. 9 is a schematic block diagram of an optical switch in a through state according to another embodiment of this application.
Figure 10:
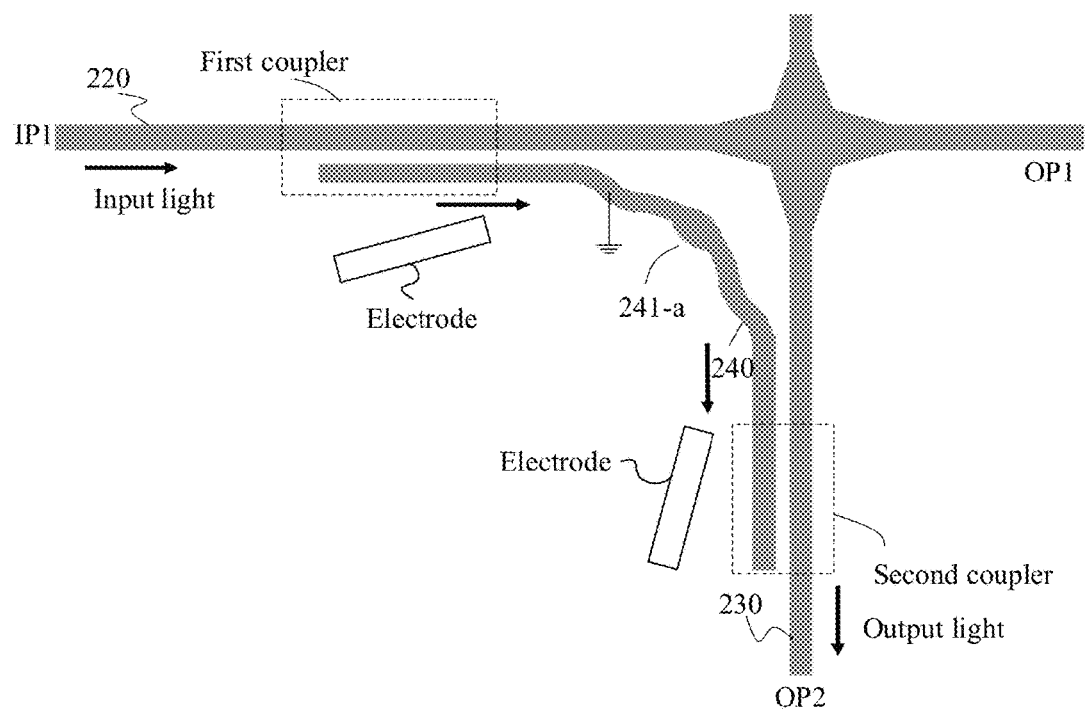
FIG. 10 is a schematic block diagram of an optical switch in a drop state according to another embodiment of this application.

Optionally, in another embodiment of this application, the first actuator 250 is parallel-plate electrodes. This type of actuator may be referred to as a parallel-plate electrostatic actuator. In a specific implementation, the first deformable waveguide 240 is grounded, a voltage may be applied to the electrodes, and a voltage difference between the electrodes and the first deformable waveguide causes the first deformable waveguide 240 to deform. Specifically, as shown in FIG. 9 and FIG. 10, the first deformable waveguide 240 may be grounded, and a voltage may be applied to the parallel-plate electrodes that are close to the two ends of the first deformable waveguide 240. When no voltage is applied to the electrodes, the optical switch is in a drop state in FIG. 10, and the two ends of the first deformable waveguide 240 are close to the first waveguide 220 and the second waveguide 230, respectively, to form the first coupler and the second coupler. When the optical switch switches from the drop state to a through state, a voltage V is applied to the electrodes, a voltage difference causes the first deformable waveguide 240 to deform, and the two ends of the first deformable waveguide 240 move close to the electrodes, respectively. The two ends of the first deformable waveguide 240 are optically decoupled from the first waveguide 220 and the second waveguide 230, respectively. In this way, the optical switch switches to the through state shown in FIG. 9. A transmission path of an optical signal is similar to that in the foregoing description. Details are not described herein again.

In this embodiment of this application, the actuator controls gaps between the first deformable waveguide and the fixed waveguides by using the parallel-plate electrodes, to form a lateral coupler. Compared with a comb electrostatic actuator, the actuator has a higher switching speed, and the switching speed may reach 1 microsecond or less. In this way, performance of the optical switch can be further improved.

The following further discusses an optical switch shown in FIG. 11 and FIG. 12. As shown in FIG. 11 and FIG. 12, the first section 241 that is of the first deformable waveguide 240 and fixed relative to the substrate 210 may further include the second fixing point 241-b and the third fixing point 241-c that are located at the two ends of the first deformable waveguide 240. In total, the first section 241 includes the first fixing point 241-a, the second fixing point 241-b, and the third fixing point 241-c. FIG. 11 and FIG. 12 show the optical switch in a through state and a drop state, respectively. Transmission of an optical signal in the two states is similar to that in FIG. 4 and FIG. 5, respectively. For brevity, details are not described herein again.

Figure 13:
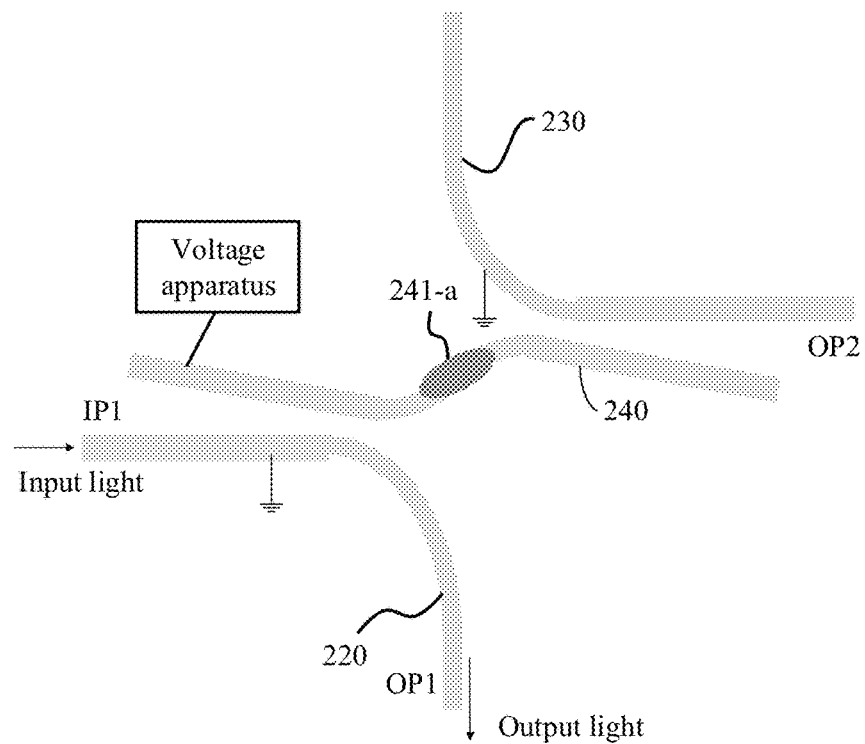
FIG. 13 is a schematic block diagram of an optical switch in a through state according to another embodiment of this application.
Figure 14:
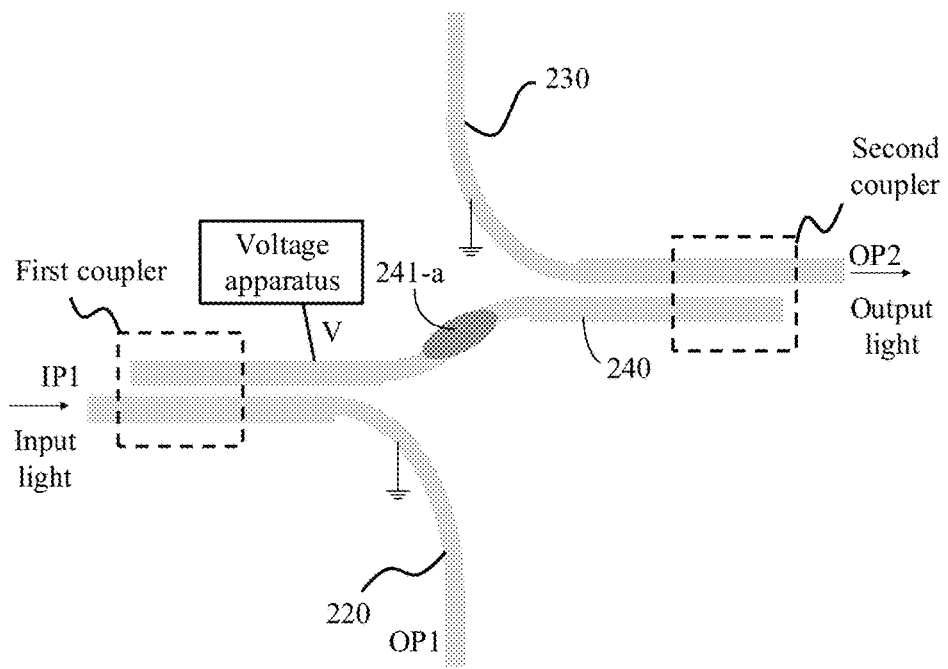
FIG. 14 is a schematic block diagram of an optical switch in a drop state according to another embodiment of this application.

Optionally, in an embodiment of this application, for a 1×2 optical switch shown in FIG. 13 and FIG. 14, both a first waveguide 220 and a second waveguide 230 may be curved waveguides, a first deformable waveguide 240 may be a straight waveguide, and the first waveguide 220 and the second waveguide 230 do not intersect. FIG. 13 and FIG. 14 show the optical switch in a through state and a drop state, respectively.

It may be considered that an actuator of the optical switch shown in FIG. 13 or FIG. 14 is formed jointly by the immovable waveguides, the first deformable waveguide, and a voltage apparatus. Specifically, the first waveguide 220 and the second waveguide 230 may be grounded, and a voltage may be applied to the first deformable waveguide 240 under control of the voltage apparatus. For example, FIG. 13 shows a state in which no voltage is applied to the first deformable waveguide 240, and the first deformable waveguide 240 is not coupled to the first waveguide 220 and the second waveguide, so that the optical switch is in the through state; FIG. 14 shows a state in which a voltage is applied to the first deformable waveguide 240, and the first deformable waveguide 240 is coupled to the first waveguide 220 and the second waveguide due to a voltage difference, so that the optical switch is in the drop state.

It should be understood that an actuator based on another principle, for example, a parallel-plate electrostatic actuator may also be used, so that when the voltage is applied to the first deformable waveguide 240, the first deformable waveguide 240 is not coupled to the first waveguide 220 and the second waveguide, and the optical switch is in the through state; and when no voltage is applied to the first deformable waveguide 240, the first deformable waveguide 240 is coupled to the first waveguide 220 and the second waveguide, and the optical switch is in the drop state. A specific actuation manner is not limited in this embodiment of this application.

Figure 15:
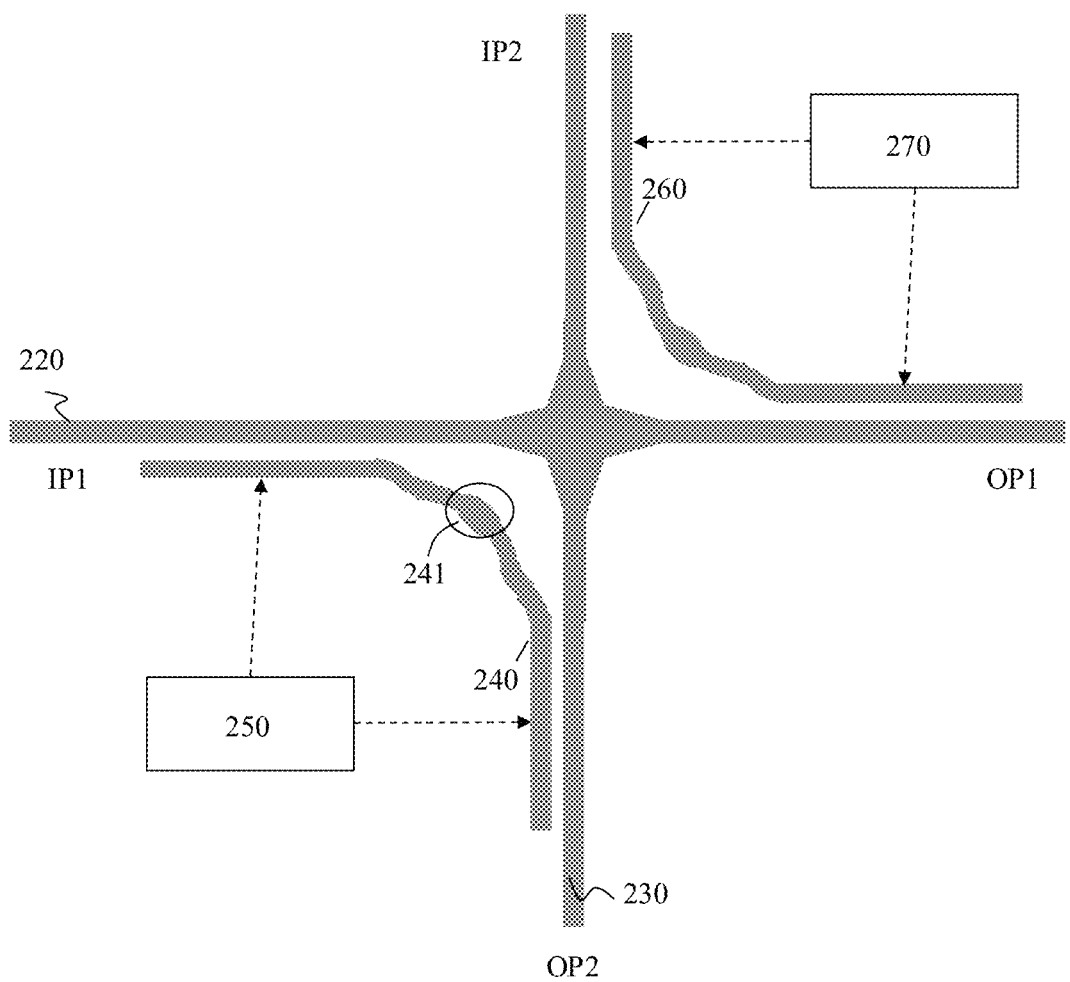
FIG. 15 is a schematic structural block diagram of an optical switch according to another embodiment of this application.

The foregoing describes the 1×2 optical switch. The following describes a 2×2 optical switch. The 2×2 optical switch is based on the 1×2 optical switch. The second waveguide 230 further has a second input port IP2. The optical switch further includes a second deformable waveguide 260. A third section of the second deformable waveguide 260 is fixed relative to the substrate 210, and a fourth section other than the third section can deform under control of a second actuator 270. When the second deformable waveguide 260 is in a third state, (1) the second deformable waveguide 260 and the first waveguide 220 are optically decoupled, and the second deformable waveguide 260 and the second waveguide 230 are optically decoupled; and (2) the IP2 and an OP2 are optically connected, and the IP2 and an OP1 are optically blocked. When the second deformable waveguide 260 is in a fourth state, (1) the second deformable waveguide 260 and the first waveguide 220 are optically coupled, and the second deformable waveguide 260 and the second waveguide 230 are optically coupled; and (2) the IP2 and the OP2 are optically blocked, and the IP2 and the OP1 are optically connected by using the second deformable waveguide 260. Principles of the 2×2 optical switch in a through state and a drop state are similar to those of the 1×2 optical switch in a through state and a drop state. Details are not described herein again. A 2×2 optical switch shown in FIG. 15 is based on the 1×2 optical switch in FIG. 3 to FIG. 12.

Figure 16:
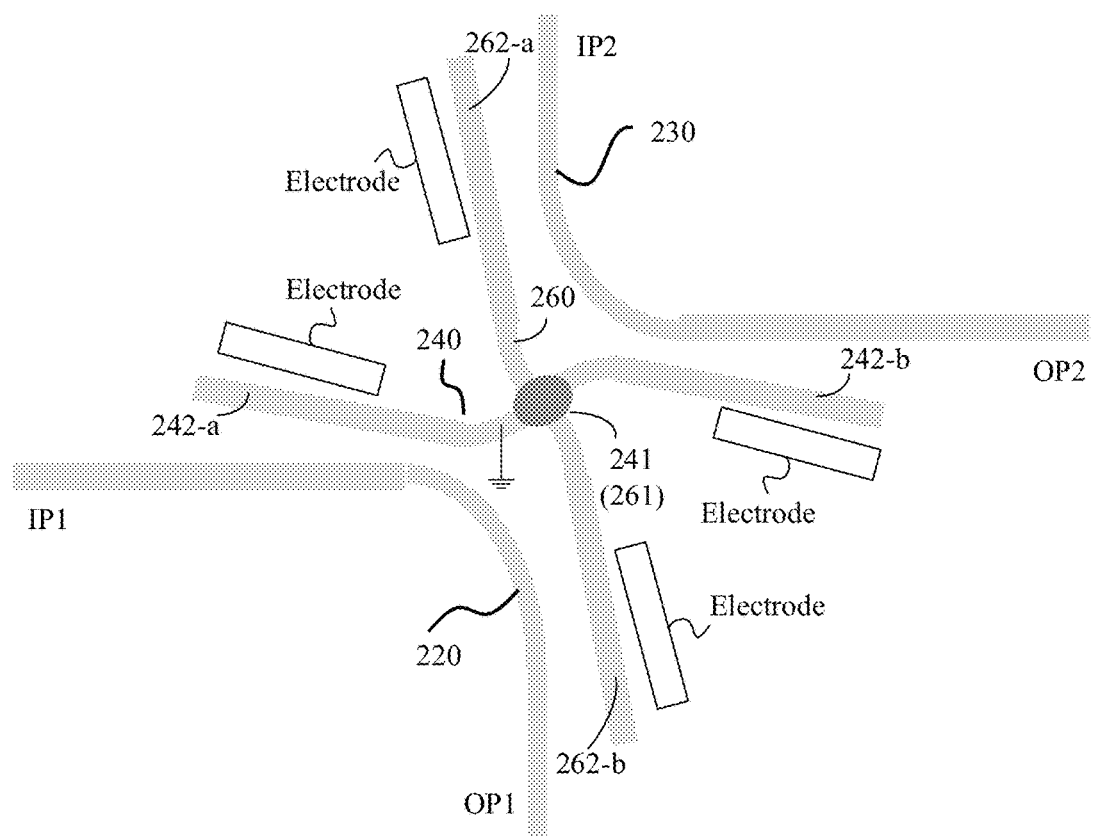
FIG. 16 is a schematic block diagram of an optical switch in a through state according to another embodiment of this application.
Figure 17:
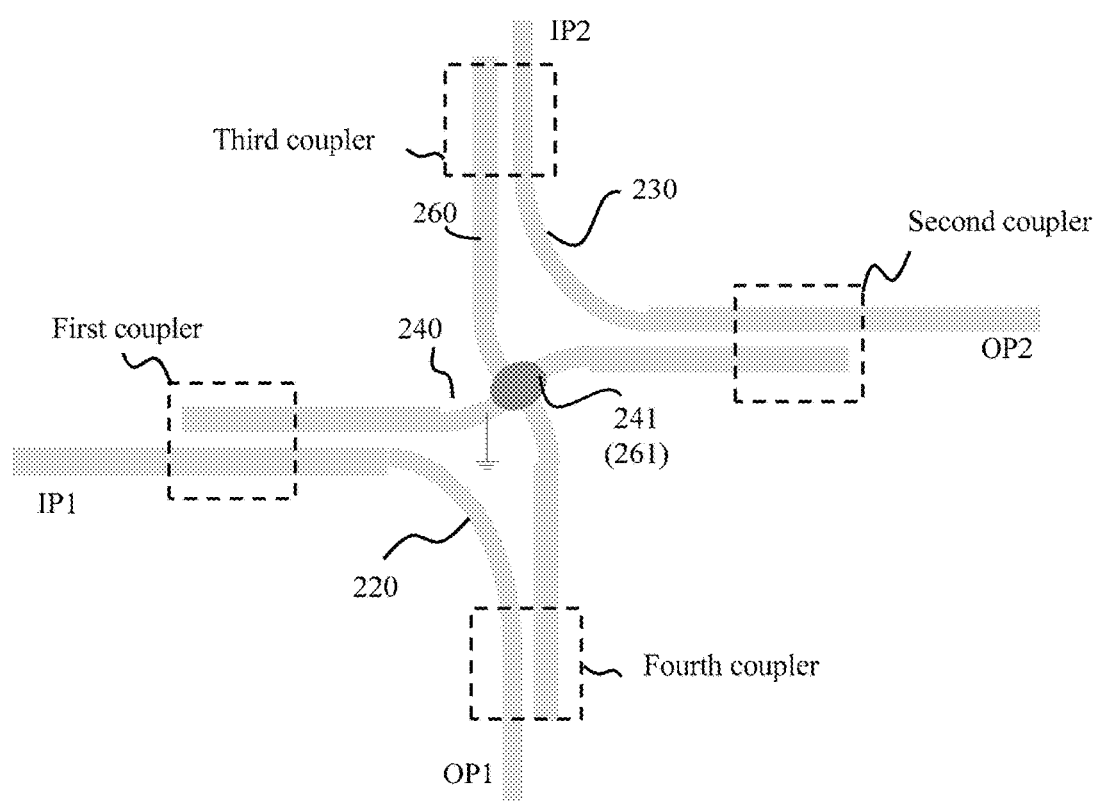
FIG. 17 is a schematic block diagram of an optical switch in a drop state according to another embodiment of this application.

Based on the 1×2 optical switch in FIG. 13 and FIG. 14, an embodiment of this application further provides a 2×2 optical switch, as shown in FIG. 16 and FIG. 17. In addition to including a first waveguide 220, a second waveguide 230, a first deformable waveguide 240, and a first actuator 250 (two electrodes in the figure that are close to a first input section 242-a and a first output section 242-b of a second section of the first deformable waveguide 240), the optical switch further includes a second deformable waveguide 260, where the second waveguide 230 further has a second input port IP2. A third section 261 (coinciding with a location of a first section 241 of the first deformable waveguide 240 in the figure) of the second deformable waveguide 260 is fixed relative to the substrate 210. A fourth section (including a second input section 262-a and a second output section 262-b in the figure) other than the third section 261 of the second deformable waveguide 260 can deform under control of a second actuator (two electrodes in the figure that are close to a first input section 262-a and a first output section 262-b of a second section of the second deformable waveguide 260).

When the second deformable waveguide 260 is in a third state, (1) the second deformable waveguide 260 and the first waveguide 220 are optically decoupled, and the second deformable waveguide 260 and the second waveguide 230 are optically decoupled; and (2) the IP2 and an OP2 are optically connected, and the IP2 and an OP1 are optically blocked. When the second deformable waveguide 260 is in a fourth state, (1) the second deformable waveguide 260 and the first waveguide 220 are optically coupled, and the second deformable waveguide 260 and the second waveguide 230 are optically coupled; and (2) the IP2 and the OP2 are optically blocked, and the IP2 and the OP1 are optically connected by using the second deformable waveguide 260. Similar to the first state and the second state, the third state is a natural state or a third deformed state of the second deformable waveguide, the fourth state is a natural state or a fourth deformed state of the second deformable waveguide, and the third state and the fourth state are not the natural state at the same time.

For the 2×2 optical switch shown in FIG. 16 and FIG. 17, the first deformable waveguide 240 and the second deformable waveguide 260 intersect. That is, transmission of an optical signal in a path of the first deformable waveguide 240 and transmission of an optical signal in a path of the second deformable waveguide 260 intersect.

Specifically, when the second deformable waveguide 260 is in the third state, the IP2 and the OP2 are optically connected, and the IP2 and the OP1 are optically blocked. When the second deformable waveguide 260 is in the fourth state, the second input section 262-a of the second deformable waveguide 260 and the second waveguide 230 form a third coupler, and the second output section 262-b of the second deformable waveguide 260 and the first waveguide 220 form a fourth coupler. Because of the third coupler, the IP2 and the OP2 are optically blocked; and because of the fourth coupler, the IP2 and the OP1 are optically connected. FIG. 16 and FIG. 17 show the optical switch in a through state and a drop state, respectively.

It should be understood that the first actuator of the optical switch in FIG. 16 and FIG. 17 is a parallel-plate electrostatic actuator and is formed by using a plurality of electrodes and a corresponding section of the first deformable waveguide (grounded). For brevity, FIG. 17 does not show the electrodes. Because of the first actuator, when a voltage is applied to a deformable waveguide, the deformable waveguide and an immovable waveguide are not coupled, and the optical switch is in the through state; and when no voltage is applied to the deformable waveguide, the deformable waveguide and the immovable waveguide are coupled, and the optical switch is in the drop state. A specific actuation manner is not limited in this embodiment of this application.

Based on the optical switch in the embodiments of this application, this application further provides an optical switching system. The optical switching system is an M×N optical switch matrix, including M×N optical switches. Each optical switch may be the optical switch shown in FIG. 3 to FIG. 12 (second waveguides 230 of these optical switches further have second input ports IP2), or may be the 2×2 optical switch shown in FIG. 15. The first waveguide 220 and the second waveguide 230 of each optical switch intersect, and each optical switch is denoted as SCij, where a value of i is 1, 2, ..., M, and a value of j is 1, 2, ..., N. The M×N optical switches are set as follows: (1) An IP1$i,j$ and an OP1$i,j-1$ are optically connected; and (2) an IP2$i,j$ and an OP2$i-1,j$ are optically connected, where a value range of i is 2 to M, and a value range of j is 2 to N.

At least one path that includes only one optical switch whose first deformable waveguide is in a second state exists between an IP1$i$,1 and an OP2M,$j$. In other words, at least one path that includes only one first deformable waveguide exists between the IP1$i$,1 and the OP2M,$j$.

When the optical switch in the matrix is the 2×2 optical switch shown in FIG. 15, at least one path that includes only one optical switch whose first deformable waveguide is in a second state exists between the IP1$i$,1 and the OP2M,$j$, and at least one path that includes only one optical switch whose second deformable waveguide is in a fourth state exists between an IP21,$j$ and an OP1$i$,N. In other words, at least one path that includes only one first deformable waveguide exists between the IP1$i$,1 and the OP2M,$j$, and at least one path that includes only one second deformable waveguide exists between the IP21,$j$ and the OP1$i$,N, where a value range of i is 1 to M, and a value range of j is 1 to N.

Figure 18:
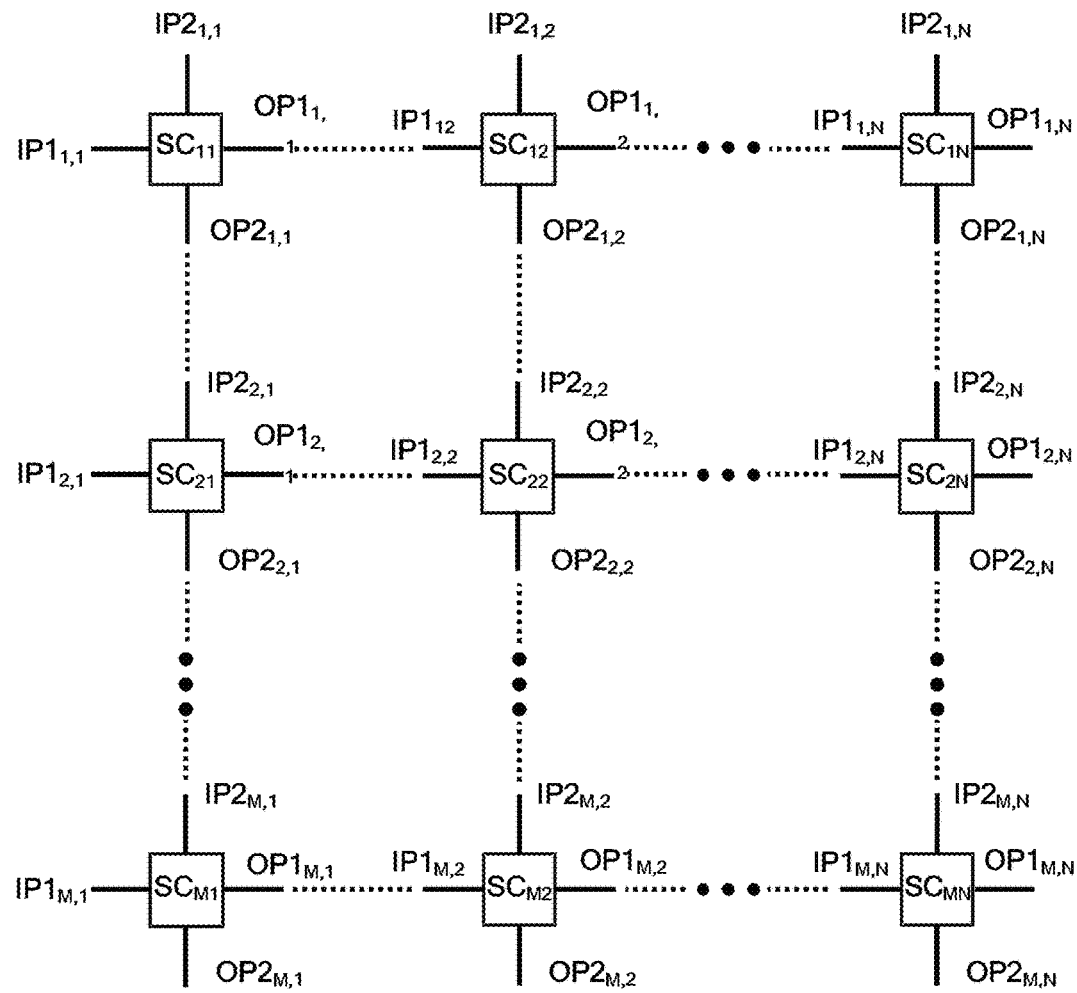
FIG. 18 is a schematic structural block diagram of an optical switching system according to an embodiment of this application.

Specifically, a connection relationship between the optical switches in the M×N optical switch matrix may be shown in FIG. 18. For example, at least one path (for example, from SC21 to SC22, SC2N, SC3N, and SCMN) that includes only one optical switch SC2N whose first deformable waveguide is in a second state exists between an IP22,1 and an OP1M,N. In other words, an optical path includes only one first deformable waveguide (a first deformable waveguide of SC2N).

For another example, when the optical switch in the matrix is a 2×2 optical switch, at least one path (for example, from SC11 to SC12 and SC1N) that includes only one optical switch SC11 whose second deformable waveguide is in a fourth state exists between an IP21,1 and an OP21,N. In other words, an optical path includes only one second deformable waveguide (a second deformable waveguide of SC11).

Based on the optical switch in the embodiments of this application, this application further provides an optical switching system. The optical switching system is an M×N optical switch matrix, including M×N optical switches shown in FIG. 13 and FIG. 14 (second waveguides 230 of these optical switches further have second input ports IP2). Alternatively, the optical switch in the matrix may be the 2×2 optical switch shown in FIG. 16 and FIG. 17. Each optical switch is denoted as SC$_{ij}$, where a value of i is 1, 2, . . . , M, and a value of j is 1, 2, . . . , N. The M×N optical switches are set as follows: (1) An IP1$_{i,j}$ and an OP2$_{i,j-1}$ are optically connected; and (2) an IP2$_{i,j}$ and an OP1$_{i-1,j}$ are optically connected, where a value range of i is 2 to M, and a value range of j is 2 to N.

At least one path that includes only one optical switch whose first deformable waveguide is in a first state exists between an IP1$_{i,1}$ and an OP1$_{M,j}$. In other words, at least one path that includes only one first waveguide exists between the IP1$_{i,1}$ and the OP1$_{M,j}$.

When the optical switch in the matrix is the 2×2 optical switch shown in FIG. 16 or FIG. 17, at least one path that includes only one optical switch whose first deformable waveguide is in a first state exists between the IP1$_{i,1}$ and the OP1$_{M,j}$, and at least one path that includes only one optical switch whose second deformable waveguide is in a third state exists between an IP2$_{1,j}$ and an OP2$_{i,N}$. In other words, at least one path that includes only one first waveguide exists between the IP1$_{i,1}$ and the OP1$_{M,j}$, and at least one path that includes only one second waveguide exists between the IP2$_{1,j}$ and the OP2$_{i,N}$, where a value range of i is 1 to M, and a value range of j is 1 to N.

Figure 19:
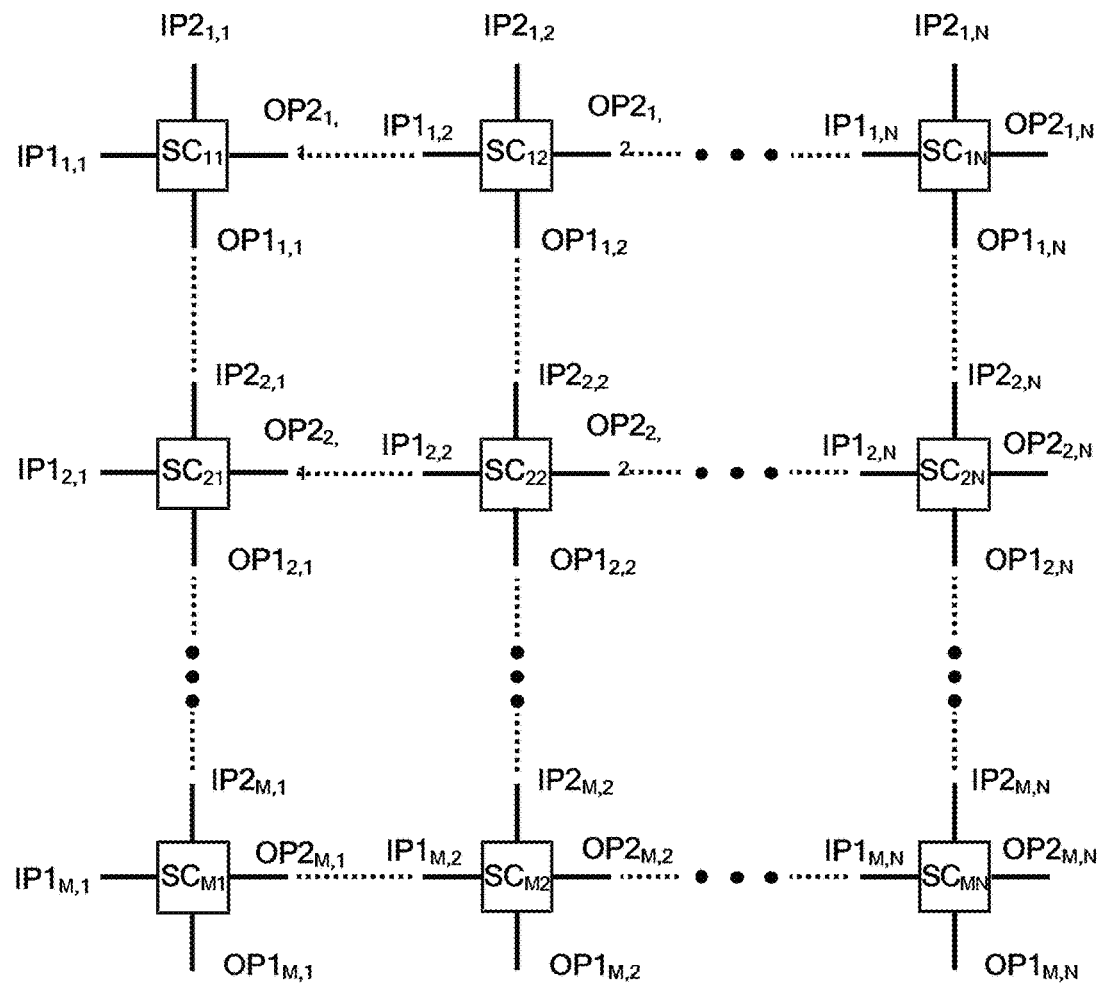
FIG. 19 is a schematic structural block diagram of an optical switching system according to an embodiment of this application.

Specifically, a connection relationship between the optical switches in the M×N optical switch matrix may be shown in FIG. 19. For example, at least one path (for example, from SC$_{21}$ to SC$_{22}$, SC$_{2N}$, SC$_{3N}$, and SC$_{MN}$) that includes only one optical switch SC$_{2N}$ whose first deformable waveguide is in a first state exists between an IP1$_{2,1}$ and an OP1$_{M,N}$. In other words, an optical path includes only one first waveguide (a first waveguide of SC$_{2N}$).

For another example, at least one path (for example, from SC$_{11}$ to SC$_{12}$ and SC$_{1N}$) that includes only one optical switch SC$_{11}$ whose second deformable waveguide is in a third state exists between an IP2$_{1,1}$ and an OP2$_{1,N}$. In other words, an optical path includes only one second waveguide (a second waveguide of SC$_{11}$).

It should be noted that, based on the optical switch in the embodiments of this application, an optical switching system having another variant connection relationship may be formed through connection. For example, changing directions of an input port and an output port of the optical switching system in FIG. 18 or FIG. 19 may be implemented by making a corresponding change to the connection relationship between the optical switches. Details are not described herein. The two optical switching systems in the embodiments of this application can implement a microsecond-level switching speed and have advantages such as a low insertion loss, a large quantity of ports, and low costs.

In the embodiments of this application, the optical switch may further include an optical power monitor, and the optical power monitor is configured to monitor optical power of at least one of the first waveguide, the second waveguide, the IP1, the OP1, and the OP2. The optical switch in the embodiments of this application monitors power of an optical signal in each element, so as to estimate a location of the first deformable waveguide 240 based on the power of the optical signal, thereby controlling the location of the first deformable waveguide 240 more accurately.

Figure 20:
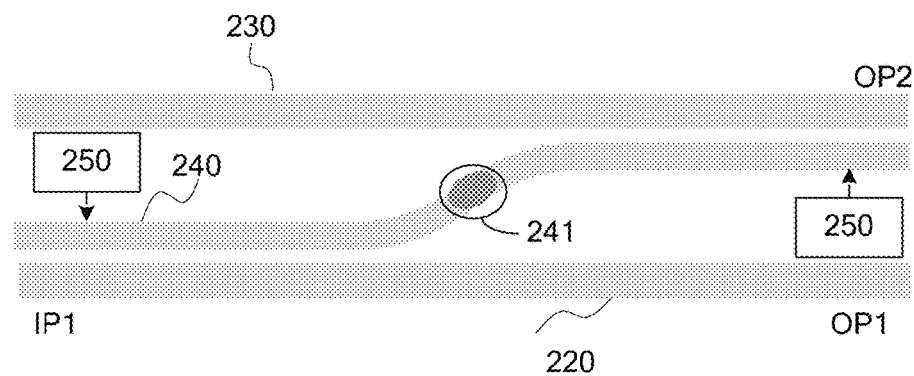
FIG. 20 is a schematic structural block diagram of an optical switch according to another embodiment of this application.

The first waveguide and the second waveguide in the optical switch shown in the foregoing figures are cross straight optical waveguides, or the first waveguide and the second waveguide are non-cross curved optical waveguides. Alternatively, the first waveguide and the second waveguide may be optical waveguides in other shapes, for example, may be straight optical waveguides shown in FIG. 20. As shown in FIG. 20, a first waveguide 220 and a second waveguide 230 are two straight optical waveguides that do not intersect each other. A first deformable waveguide 240 may be an optical waveguide having a curved section and straight sections shown in FIG. 20. The straight sections of the first deformable waveguide 240 can deform under control of an actuator 250, and are optically decoupled or optically coupled to the first waveguide 220 and the second waveguide 230, respectively, so as to control a through state and a drop state of the optical switch.

Based on a similar expansion manner mentioned in the foregoing description, a 2×2 optical switch may be obtained from the 1×2 optical switch shown in FIG. 20. When the 2×2 optical switch and a similar optical switch whose immovable waveguides are non-cross straight optical waveguides form an optical switch matrix, an extra curved optical waveguide needs to be added, to form a crossbar structure through connection.

It should be understood that the first, the second, the third, the fourth, and various numbers in this specification are used for differentiation only for ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate components may or may not be physically separate, and components displayed as units may or may not be physical units, may be located in one position, or may be distributed on a plurality of network units. Some or all of the units may be selected depending on actual needs, to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical switch, wherein the optical switch is disposed on a substrate, and the optical switch comprises:
   a first waveguide;
   a second waveguide;
   a first deformable waveguide; and
   a first actuator;
   wherein the first waveguide is immovable relative to the substrate, and the first waveguide has a first input port (IP1) and a first output port (OP1);
   wherein the second waveguide is immovable relative to the substrate, the second waveguide has a second output port (OP2), and the first waveguide and the second waveguide are located in a first plane;
   wherein the first deformable waveguide is also located in the first plane, a first section of the first deformable waveguide is fixed relative to the substrate, and a second section other than the first section can deform under control of the first actuator;
   when the first deformable waveguide is in a first state, (1) the first deformable waveguide and the first waveguide are optically decoupled, and the first deformable waveguide and the second waveguide are optically decoupled; and (2) the IP1 and the OP1 are optically connected, and the IP1 and the OP2 are optically blocked;
   when the first deformable waveguide is in a second state, (1) the first deformable waveguide and the first waveguide are optically coupled, and the first deformable waveguide and the second waveguide are optically coupled; and (2) the IP1 and the OP1 are optically blocked, and the IP1 and the OP2 are optically connected by using the first deformable waveguide; and
   wherein the first state is a natural state or a first deformed state of the first deformable waveguide, the second state is a natural state or a second deformed state of the first deformable waveguide, and the first state and the second state are not the natural state at the same time.

2. The optical switch according to claim 1, wherein the first section comprises a first fixing point located at a middle location of the first deformable waveguide.

3. The optical switch according to claim 2, wherein the first section further comprises a second fixing point and a third fixing point that are located at two ends of the first deformable waveguide.

4. The optical switch according to claim 1, wherein the first actuator is connected to the second section of the first deformable waveguide by a cantilever.

5. The optical switch according to claim 1, wherein the first actuator is parallel-plate electrodes.

6. The optical switch according to claim 5, wherein the first deformable waveguide is grounded, a voltage is applied to the parallel-plate electrodes, and a voltage difference between the parallel-plate electrodes and the first deformable waveguide causes the first deformable waveguide to deform.

7. The optical switch according to claim 1, wherein the second section comprises a first input section and a first output section; and
when the first deformable waveguide is in the second deformed state, the first input section of the first deformable waveguide and the first waveguide form a first coupler, and the first output section of the first deformable waveguide and the second waveguide form a second coupler.

8. The optical switch according to claim 7, wherein along a transmission direction of an optical signal, an effective refractive index of the first input section of the first coupler gradually increases, and an effective refractive index of the first output section of the second coupler gradually decreases.

9. The optical switch according to claim 8, wherein along the transmission direction of the optical signal, an effective refractive index of the first waveguide of the first coupler gradually decreases, and an effective refractive index of the second waveguide of the second coupler gradually increases.

10. The optical switch according to claim 1, wherein the second waveguide further has a second input port (IP2); the optical switch further comprises a second deformable waveguide, a third section of the second deformable waveguide is fixed relative to the substrate, and a fourth section other than the third section can deform under control of a second actuator;
when the second deformable waveguide is in a third state, (1) the second deformable waveguide and the first waveguide are optically decoupled, and the second deformable waveguide and the second waveguide are optically decoupled; and (2) the IP2 and the OP2 are optically connected, and the IP2 and the OP1 are optically blocked;
when the second deformable waveguide is in a fourth state, (1) the second deformable waveguide and the first waveguide are optically coupled, and the second deformable waveguide and the second waveguide are optically coupled; and (2) the IP2 and the OP2 are optically blocked, and the IP2 and the OP1 are optically connected by the second deformable waveguide; and
wherein the third state is a natural state or a third deformed state of the second deformable waveguide, the fourth state is a natural state or a fourth deformed state of the second deformable waveguide, and the third state and the fourth state are not the natural state at the same time.

11. The optical switch according to claim 1, wherein the optical switch further comprises an optical power monitor, and the optical power monitor is configured to monitor optical power of at least one of the first waveguide, the second waveguide, the IP1, the OP1, and the OP2.

12. An optical switching system, wherein the optical switching system is an M×N optical switch matrix, comprising:
M×N optical switches according to claim 1; and
a second waveguide of the optical switch further has a second input port (IP2), and
wherein:
a first waveguide and the second waveguide intersect;
each optical switch is denoted as $SC_{i,j}$, wherein a value of i is 1, 2, ..., M, and a value of j is 1, 2, ..., N; and
the M×N optical switches are set as follows: (1) an $IP1_{i,j}$ and an $OP1_{i,j-1}$ are optically connected and (2) an $IP2_{i,j}$ and an $OP2_{i-1,j}$ are optically connected, wherein a value range of i is 2 to M, and a value range of j is 2 to N.

13. The optical switching system according to claim 12, wherein at least one path that comprises only one optical switch whose first deformable waveguide is in a second state exists between an $IP1_{i,1}$ and an $OP2_{M,j}$, a value range of i is 1 to M, and a value range of j is 1 to N.

14. An optical switching system, wherein the optical switching system is an M×N optical switch matrix, comprising:
M×N optical switches according to claim 1; and
the second waveguide of the optical switch further has a second input port IP2, and
wherein:
the first waveguide and the second waveguide do not intersect;
each optical switch is denoted as $SC_{i,j}$, wherein a value of i is 1, 2, ..., M, and a value of j is 1, 2, ..., N; and
the M×N optical switches are set as follows: (1) an $IP1_{i,j}$ and an $OP2_{i,j-1}$ are optically connected; and (2) an $IP2_{i,j}$ and an $OP1_{i-1,j}$ are optically connected, wherein a value range of i is 2 to M, and a value range of j is 2 to N.

15. The optical switching system according to claim 14, wherein at least one path that comprises only one optical switch whose first deformable waveguide is in a first state exists between an $IP1_{i,1}$ and an $OP1_{M,j}$, a value range of i is 1 to M, and a value range of j is 1 to N.

* * * * *